US009571026B2

(12) United States Patent
Agata et al.

(10) Patent No.: US 9,571,026 B2
(45) Date of Patent: Feb. 14, 2017

(54) INVERTER APPARATUS

(71) Applicant: AISIN AW CO., LTD., Anjo-shi, Aichi-ken (JP)

(72) Inventors: Hiromichi Agata, Nishio (JP); Kazuo Aoki, Anjo (JP); Yasushi Nakamura, Nishio (JP)

(73) Assignee: AISIN AW CO., LTD., Anjo (JP)

(*) Notice: Subject to any disclaimer, the term of this patent is extended or adjusted under 35 U.S.C. 154(b) by 0 days.

(21) Appl. No.: 14/899,044

(22) PCT Filed: Mar. 10, 2014

(86) PCT No.: PCT/JP2014/056124
§ 371 (c)(1),
(2) Date: Dec. 16, 2015

(87) PCT Pub. No.: WO2015/011941
PCT Pub. Date: Jan. 29, 2015

(65) Prior Publication Data
US 2016/0134221 A1   May 12, 2016

(30) Foreign Application Priority Data

Jul. 23, 2013   (JP) .................................. 2013-153068

(51) Int. Cl.
*H02P 3/14*   (2006.01)
*H02P 27/06*   (2006.01)
(Continued)

(52) U.S. Cl.
CPC ................ *H02P 27/06* (2013.01); *H02M 1/32* (2013.01); *H02M 7/797* (2013.01); *H02P 21/0035* (2013.01); *H02M 2001/0009* (2013.01)

(58) Field of Classification Search
CPC ................................. H02P 27/04; H02P 27/06
(Continued)

(56) References Cited

U.S. PATENT DOCUMENTS

| 8,040,096 B2 * | 10/2011 | Taniguchi | ............... H02M 1/32 318/490 |
| 8,681,457 B2 * | 3/2014 | Minegishi | .............. B60K 6/445 318/139 |
| 2011/0080149 A1 | 4/2011 | Fukuta et al. | |

FOREIGN PATENT DOCUMENTS

| JP | S64-60224 A | 3/1989 |
| JP | H04-69096 A | 3/1992 |

(Continued)

OTHER PUBLICATIONS

Jun. 3, 2014 Search Report issued in International Patent Application No. PCT/2014/056124.

*Primary Examiner* — Antony M Paul
(74) *Attorney, Agent, or Firm* — Oliff PLC

(57) ABSTRACT

An inverter apparatus that includes an inverter that is interposed between an AC rotary electric machine and both a DC power supply and a smoothing capacitor and that includes a plurality of switching elements; a controller that controls driving of the plurality of switching elements; and a current sensor that detects a current flowing through a wire connecting the DC power supply and the inverter together, wherein the controller determines whether or not to stop driving of all of the plurality of switching elements based on the current detected by the current sensor while the AC rotary electric machine is caused to perform a regenerative operation of generating power.

20 Claims, 6 Drawing Sheets

(51) Int. Cl.
  *H02M 1/32*  (2007.01)
  *H02M 7/797*  (2006.01)
  *H02P 21/00*  (2016.01)
  *H02M 1/00*  (2006.01)

(58) Field of Classification Search
  USPC ............ 318/139, 560, 400.01, 400.02,
    400.14,318/400.15, 700, 701, 721, 722,
    727, 799, 800,318/801, 432, 362, 374,
    375, 376; 363/40, 44, 363/95, 120, 174,
    175
  See application file for complete search history.

(56) References Cited

FOREIGN PATENT DOCUMENTS

| | | |
|---|---|---|
| JP | H07-337030 A | 12/1995 |
| JP | H10-150795 A | 6/1998 |
| JP | 2001-028880 A | 1/2001 |
| JP | 2002-017098 A | 1/2002 |
| JP | 2011-083123 A | 4/2011 |

* cited by examiner

INVERTER APPARATUS

BACKGROUND

The present disclosure relates to an inverter apparatus including an inverter interposed between an AC rotary electric machine and both a DC power supply and a smoothing capacitor and including a plurality of switching elements, and a control apparatus that controls driving of the plurality of switching elements.

As inverter apparatuses as described above, for example, apparatuses described in Japanese Patent Application Publication No. 2011-083123 and Japanese Patent Application Publication No. H4-069096 are already known. In a technique in Japanese Patent Application Publication No. 2011-083123, an inverter apparatus is configured such that in order to release electric charge stored in a smoothing capacitor when a relay electrically connecting a DC power supply and an inverter together is set to an open state, both a switching element on a positive electrode side and a switching element on a negative electrode side are set to an on state to short-circuit both terminals of the smoothing capacitor.

In a technique in Japanese Patent Application Publication No. H4-069096, an inverter apparatus is configured such that when a voltage between the terminals of a smoothing capacitor is increased by regenerative power generated by an AC rotary electric machine, a switching element provided in an overvoltage protection circuit is turned on to connect the terminals of the smoothing capacitor together via a resistor, and thus the increase in voltage is suppressed.

SUMMARY

While the AC rotary electric machine is caused to perform a regenerative operation, the electrical connection between the DC power supply and the inverter may be unexpectedly disconnected as a result of, for example, a failure in which the relay shifts from a closed state to an open state due to some factor. When a control apparatus for the inverter fails to detect such disconnection and continues the regenerative operation, a system voltage across a wire on a positive electrode side and a wire on a negative electrode side increases rapidly. When the system voltage increases above the withstand voltage of the switching element, the switching element may be broken.

Thus, it is desirable that the deletion of the connection be detected as early as possible and the regenerative operation be stopped to suppress the increase in the system voltage.

However, the technique in Japanese Patent Application Publication No. 2011-083123 is a technique in which the electric charge stored in the smoothing capacitor is released after normal detection of the relay being set to the open state. If an abnormality occurs, such as a failure to detect that the relay is set to the open state, the technique fails to effectively suppress a rapid increase in system voltage.

Furthermore, the technique in Japanese Patent Application Publication No. H4-069096 is expected to suppress an increase in system voltage in a normal regenerative operation. However, the technique in Japanese Patent Application Publication No. H4-069096 involves observing the system voltage, and is thus expected to be limited in the suppression of a rapid increase in the system voltage when the electrical connection between the DC power supply and the inverter is disconnected.

This is because the increase in system voltage following the disconnection involves a response delay due to a smoothing effect of the smoothing capacitor, so that the method of observing the system voltage is likely to cause a long determination delay after the disconnection until execution of an operation of suppressing an increase in the system voltage.

Thus, it is desirable to provide an inverter apparatus that can perform an operation of suppressing an increase in system voltage early when the electrical connection between the DC power supply and the inverter is unexpectedly disconnected while the AC rotary electric machine is caused to perform a regenerative operation.

An inverter apparatus according to an exemplary aspect of the disclosure includes an inverter that is interposed between an AC rotary electric machine and both a DC power supply and a smoothing capacitor and that includes a plurality of switching elements; a controller that controls driving of the plurality of switching elements; and a current sensor that detects a current flowing through a wire connecting the DC power supply and the inverter together, wherein the controller determines whether or not to stop driving of all of the plurality of switching elements based on the current detected by the current sensor while the AC rotary electric machine is caused to perform a regenerative operation of generating power.

When an electrical connection between the DC power supply and the inverter is disconnected, a system voltage across a positive-electrode-side portion of the wire and a negative-electrode-side portion of the wire increases rapidly to cause a rapid decrease in the current flowing through the wire connecting the DC power supply and the inverter together. At this time, the increase in system voltage involves a response delay resulting from a smoothing effect of the smoothing capacitor. However, the decrease in current is unlikely to involve such a response delay.

In the above-described characteristic structure, the inverter apparatus further includes the current sensor that detects the current flowing through the wire connecting the DC power supply and the inverter together. Thus, the current sensor allows direct detection of a decrease in the current flowing through the connection wire as a result of disconnection of the electrical connection between the DC power supply and the inverter. The controller makes the determination based on the current detected by the current sensor, which involves a shorter response delay following the disconnection than the system voltage. This makes a delay after disconnection of the electrical connection between the DC power source and the inverter until stoppage of driving of the switching elements shorter than a delay in the case of determination based on the system voltage. Therefore, after the electrical connection between the DC power supply and the inverter is disconnected, the increase in system voltage can be effectively suppressed.

Thus, the cost and size of the apparatus can be reduced by decreasing the capacity of the smoothing capacitor or reducing the withstand voltage of the switching elements.

Preferably, the controller is programmed to: drive the plurality of switching elements; output a regeneration signal while controlling the drive of the plurality of switching elements to cause the AC rotary electric machine to perform the regenerative operation of generating power equal to or higher than a preset determination power; and determine whether or not to stop the driving of all of the plurality of switching elements, and upon determining to stop the driving, output a blockage signal that is a signal allowing the driving of all of the plurality of switching elements to be stopped, wherein the processor determines whether or not the inverter apparatus is in a regenerating reduction-current state where the current detected by the current sensor is smaller than a preset current determination threshold while the regeneration signal is output, and whether or not to stop the driving of all of the plurality of switching elements is determined based on a determination result of whether or not the inverter apparatus is in the regenerating reduction-current state.

A speed at which the system voltage increases after disconnection of the electrical connection between the DC power supply and the inverter increases in proportion to the power generated by the AC rotary electric machine. Thus, particularly for high generated power, it is more necessary to detect the disconnection of electrical connection early to stop the driving of all of the switching elements. In the above-described structure, when the power generated by the AC rotary electric machine is higher than the determination power, the increase in the system voltage can be effectively suppressed by stopping the driving of the switching elements early after the disconnection of the electrical connection based on the current detected by the current sensor, which involves a short response delay following the disconnection.

Furthermore, when the AC rotary electric machine generates low power, a smaller current flows through the wire connecting the DC power supply and the inverter together even in a normal state where the electrical connection between the DC power supply and the inverter is not disconnected. This state is similar to the state where the electrical connection is disconnected, which lowers determination accuracy based on the current detected by the current sensor. In the above-described structure, under a condition that a larger current flows through the connection wire in the normal state where the power generated by the AC rotary electric machine is equal to or higher than the determination power and where the electrical connection is not disconnected, the driving of the switching elements can be stopped by accurately determining whether or not the electrical connection is disconnected based on the current detected by the current sensor. Therefore, a situation is inhibited where, when the AC rotary electric machine generates low power, the driving of all of the switching elements is stopped to discontinue the power generation by the AC rotary electric machine even though the electrical connection is not disconnected.

Preferably, when the processor determines that the inverter apparatus is in the regenerating reduction-current state, the processor determines to stop the driving of all of the plurality of switching elements and outputs the blockage signal.

In this structure, after the current detected by the current sensor during the regenerative operation is determined to be smaller than a current determination threshold, the blockage signal can be immediately output to the driving section to allow the driving of the switching elements to be stopped.

Preferably, the processor determines to stop the driving of all of the plurality of switching elements when voltage across a positive-electrode-side portion of the wire and a negative-electrode-side portion of the wire that connect the DC power supply and the inverter together is higher than a preset voltage determination threshold, and the processor sets the voltage determination threshold smaller when the processor determines that the inverter apparatus is in the regenerating reduction-current state than when the processor does not determine that the inverter apparatus is in the regenerating reduction-current state.

In this structure, the voltage determination value is reduced when the current detected by the current sensor during the regenerative operation is determined to be smaller than the current determination threshold. Thus, the delay until the driving of the switching elements is stopped can be shortened even when the determination is based on the system voltage.

Preferably, the processor outputs a low-current signal when the current detected by the current sensor is smaller than the current determination threshold, and outputs a regenerating reduction-current signal indicating that the inverter apparatus is in the regenerating reduction-current state upon receiving both the low-current signal and the regeneration signal.

In this structure, a hardware circuit is used for the determination, which enables increasing processing speed and shortening of the delay until the driving of the switching elements is stopped.

Preferably, the smoothing capacitor is connected between the positive-electrode-side portion of the wire and the negative-electrode-side portion of the wire that connect the DC power supply and the inverter together. Preferably, the current sensor is provided on the positive-electrode-side portion of the wire or the negative-electrode-side portion of the wire at a position closer to the DC power supply than a portion of the wire connected to the smoothing capacitor.

In this structure, even after the electrical connection between the DC power supply and the inverter is disconnected, the smoothing effect of the smoothing capacitor allows a current resulting from regeneration to flow from the switching elements into the smoothing capacitor. Even in this case, since the current sensor is provided on the wire at the position closer to the DC power supply than the portion of the wire connected to the smoothing capacitor, the current flowing from the switching elements into the smoothing capacitor can be prevented from being detected. Therefore, when the electrical connection between the DC power supply and the inverter is disconnected and the flow of a current is prevented at the disconnected portion, the current detected by the current sensor is accordingly reduced. Thus the blockage of a current can be quickly detected.

Preferably, the DC power supply includes a relay that enables the electrical connection to the inverter to be disconnected, and the current sensor is provided on the wire between the relay and the portion of the wire connected to the smoothing capacitor.

In this structure, when a failure in which the relay shifts from a closed state to an open state occurs due to some factor, the current sensor provided between the relay and the portion of the wire connected to the smoothing capacitor allows the blockage of a current to be quickly detected.

BRIEF DESCRIPTION OF THE DRAWINGS

FIG. 1 is a diagram depicting a general structure of an inverter apparatus according to an embodiment of the present disclosure and the like.

DETAILED DESCRIPTION OF EMBODIMENTS

An embodiment of an inverter apparatus 2 according to the present disclosure will be described with reference to the drawings.

Figure 1:
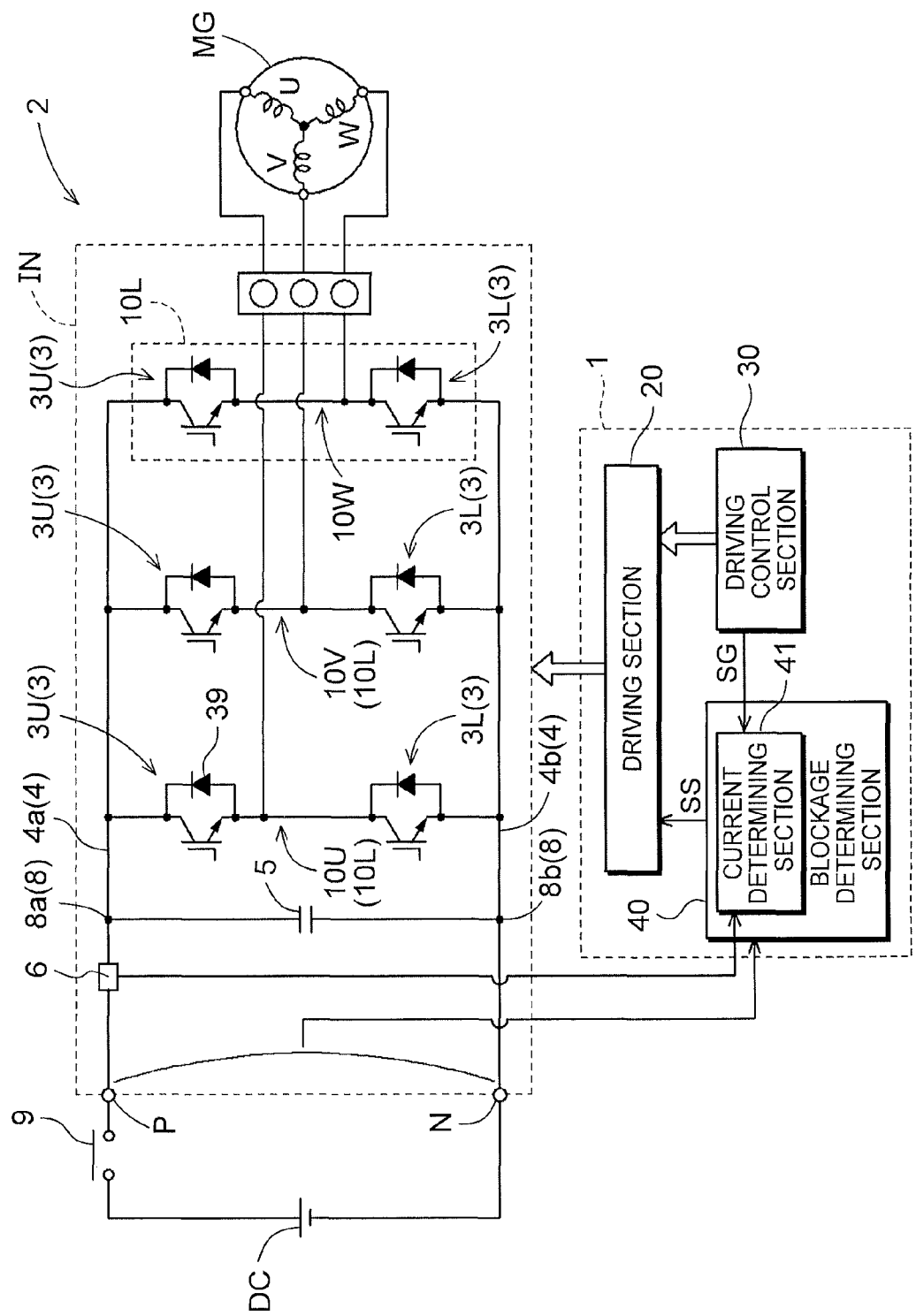

FIG. 1 is a schematic diagram depicting a general structure of the inverter apparatus 2 or the like including an inverter IN and a control apparatus 1 (controller) according to the present embodiment.

The inverter IN is interposed between an AC rotary electric machine MG and both a DC power supply DC and a smoothing capacitor 5, and includes a plurality of switching elements 3. The control apparatus 1 controls driving of the plurality of switching elements 3.

The inverter apparatus 2 includes a current sensor 6 that detects a current flowing through a wire 4 connecting the DC power supply DC and the inverter IN together.

The control apparatus 1 is structured to determine whether or not to stop driving of all of the plurality of switching elements 3 based on a current detected by the current sensor 6 while the AC rotary electric machine MG is caused to perform a regenerative operation of generating power.

1. Structure of the Inverter IN

The inverter IN converts DC power relating to the DC power supply DC and AC power relating to the AC rotary electric machine MG.

In the present embodiment, DC power supplied from the DC power supply DC is converted into AC power of a plurality of phases (n phases where n is a natural number; in this case, three phases), and the AC power is supplied to the AC rotary electric machine MG. Furthermore, power generated (regenerated) by the AC rotary electric machine MG is converted into DC power, and the DC power is supplied to the DC power supply DC.

The inverter IN includes a plurality of switching elements 3. As the switching elements 3, power semiconductor elements such as IGBTs (insulated gate bipolar transistors) or power MOSFETs (metal oxide semiconductor Field effect transistors) are used.

For example, the inverter IN, which converts DC power into multi-phase AC power (in this case, three-phase AC power), is structured using a bridge circuit with a number of arms corresponding to the respective phases (in this case, three phases). In other words, as depicted in FIG. 1, one arm 10L is structured by connecting two switching elements 3 in series between a positive-electrode-side sire 4a and a negative-electrode-side wire 4b in the inverter IN. The switching elements 3 each connected to a position closer to the positive-electrode-side wire 4a than a part connected to the AC rotary electric machine MG are referred to as upper-stage-side switching elements 3U (upper-stage-side switching elements or high-side switches). The switching elements 3 each connected to a position closer to the negative-electrode-side wire 4b than the part connected to the AC rotary electric machine MG are referred to as lower-stage-side switching elements 3L (negative-electrode-side switching elements or low-side switches). The positive-electrode-side wire 4a and the pole-side wire 4b include bus bars.

For three-phase AC, three lines (three phases: 10U, 10V, 10W) of this series circuit (one arm 10L) are connected together in parallel. In other words, a bridge circuit is structured in which the set of series circuits (arms 10L) corresponds to respective stator coils for a U phase, a V phase, and a W phase of the AC rotary electric machine MG.

A collector terminal of the upper-stage-side switching element 3U of each phase is connected to the positive-electrode-side wire 4a. An emitter terminal of the upper-stage-side switching element 3U is connected to a collector terminal of the lower-stage-side switching element 3L of each phase. Furthermore, an emitter terminal of the lower-stage-side switching element 3L of each phase is connected to the negative-electrode-side wire 4b. An intermediate point of the series circuit (arms 10L) of a pair of the switching elements 3 of each phase, in other words, the connection point between the upper-stage-side switching element 3U and the lower-stage-side switching element 3L, is connected to the corresponding stator coil of the AC rotary electric machine MG.

A free wheel diode 39 (regenerative diode) is connected in parallel with each of the switching elements 3. The free wheel diode 39 is connected in parallel with each switching element 3 such that a cathode terminal of the free wheel diode 39 is connected to the collector terminal of the switching element 3 and such that an anode terminal of the free wheel diode 39 is connected to the emitter terminal of the switching element 3.

<Smoothing Capacitor 5>

The smoothing capacitor 5 is connected between the positive-electrode-side sire 4a and the negative-electrode-side wire 4b to smooth a DC voltage (system voltage Vdc) between the positive-electrode-side wire 4a and the negative-electrode-side wire 4b.

As depicted in FIG. 1, the smoothing capacitor 5 is provided between the main body section of the inverter IN having the switching elements 3 and the DC power supply DC and in parallel with main body section and the DC power supply DC. A positive electrode terminal of the smoothing capacitor 5 is connected to the positive-electrode-side wire 4a. A negative electrode terminal of the smoothing capacitor 5 is connected to the negative-electrode-side wire 4b.

The smoothing capacitor 5 smooths and stabilizes a DC voltage that varies according to a variation in power consumption of the AC rotary electric machine MG or an on/off operation of the switching elements 3. The smoothing action is enhanced by increasing the capacity of the smoothing capacitor 5.

2. Structure of the DC Power Supply DC

In the present embodiment, the DC power supply DC is a power storage apparatus such as a battery.

The DC power supply DC may be provided with a DC-DC converter. The DC-DC converter is a converter for DC power (DC voltage) that increases and reduces the DC voltage. The DC-DC converter is structured using a switching element and a coil.

The DC power supply DC includes a relay 9 that enables the electrical connection to the inverter IN to be disconnected. The relay 9 is a switch that enables the electrical connection between the DC power supply DC (power storage apparatus) and the inverter IN to be switched between a connected state and a disconnected state. In the present embodiment, as the relay 9, an electromagnetic relay is used which is opened and closed by using an electromagnet to physically move a contact. The relay 9 is a system main relay (SMR) that is opened and closed in conjunction with power-on and -off of the system as a whole.

The relay 9 is provided on the wire 4 connecting the DC power supply DC (power storage apparatus) and the inverter IN together. In the present embodiment, the relay 9 is provided on the positive-electrode-side wire 4a between a portion 8 of the wire connected to the smoothing capacitor 5 and the DC power supply DC. The relay 9 may be provided on the negative-electrode-side wire 4b or on both the positive-electrode-side wire 4a and the negative-electrode-side wire 4b.

3. Structure of the Control Apparatus 1

The control apparatus 1 controls driving of the plurality of switching elements 3.

The control apparatus 1 is structured to determine whether or not to stop the driving of all of the plurality of switching elements 3 based on a current detected by the current sensor 6 while the AC rotary electric machine MG is caused to perform a regenerative operation of generating power. The control apparatus 1 is structured to, upon determining to stop the driving, stop the driving of all of the plurality of switching elements 3.

In the present embodiment, the control apparatus 1 includes a driving section 20, a driving control section 30, and a blockage determining section 40.

3-1. Driving Section 20

The driving section 20 drives the plurality of switching elements 3.

The driving section 20 includes a plurality of driving circuits corresponding to the respective switching elements 3. That is, as many driving circuits as the switching elements 3 are provided.

A gate terminal of each switching element 3 that is a control terminal is connected to the corresponding driving circuit.

In accordance with an on instruction or an off instruction for each switching element 3 transmitted from the driving control section 30, each driving circuit outputs an on voltage signal or an off voltage signal to the corresponding switching element 3 to set the switching element 3 to an on state or an off state.

When the blockage determining section 40 has output a blockage signal SS, the driving section 20 forcibly causes all of the driving circuits to output the off voltage signal to set all of the switching elements 3 to the off state, regardless of the on instruction or the off instruction transmitted from the driving control section 30.

3-2. Driving Control Section 30

The driving control section 30 instructs the driving section 20 so as to control the switching elements 3 to be turned on or off.

The driving control section 30 transmits, to the driving section 20, the on instruction or the off instruction for each of the switching elements 3 (driving circuits).

The driving control section 30 includes, as a core member, an arithmetic processing apparatus such as a CPU, and also has storage apparatuses such as a RAM (random access memory) structured to enable the arithmetic processing apparatus to execute data reading and writing on the RAM and a ROM (read only memory) structured to enable the arithmetic processing apparatus to execute data reading on the ROM. Functional sections that control the inverter IN and the AC rotary electric machine MG are structured using software (program) stored in, for example, the ROM of the driving control section 30 or separately provided hardware such as an arithmetic circuit or both thereof.

For example, the driving control section 30 includes various functional sections that control the AC rotary electric machine MG via the driving section 20 and the inverter IN by performing current feedback control using a vector control method.

<Output of the Regeneration Signal SG>

The driving control section 30 is structured to output a regeneration signal SG while controlling the driving section 20 to allow the AC rotary electric machine MG to generate power equal to or higher than preset determination power. The determination power is set to a preset value larger than zero.

In the present embodiment, the determination power is set such that, in a normal state where the electrical connection between the DC power supply DC and the inverter IN described below is not disconnected, a current flowing through the wire 4 connecting the DC power supply DC and the inverter IN together has a value larger than a current determination threshold set in a current determining section 41. For example, the determination power is set equal to power resulting from multiplication, by a system voltage Vdc in the normal state, of a current resulting from multiplication of the current determination threshold by a predetermined multiple larger than 1 (for example, 2).

In the present embodiment, the driving control section 30 is structured to output a predetermined high voltage (for example, 1 V) as the regeneration signal SG while allowing the AC rotary electric machine MG to perform a regenerative operation of generating power equal to or higher than the preset determination power and otherwise to output a predetermined low voltage (for example, 0 V) instead of outputting the regeneration signal SG (predetermined high voltage).

3-3. Blockage Determining Section 40

The blockage determining section 40 determines whether or not to stop the driving of all of the plurality of switching elements 3, and upon determining to stop the driving, outputs to the driving section 20 a blockage signal SS allowing the driving of all of the plurality of switching elements 3 to be stopped.

In the present embodiment, the blockage determining section 40 is structured to output a predetermined high voltage (for example, 1 V) as the blockage signal SS upon determining to stop the driving and to output a predetermined low voltage (for example, 0 V) instead of outputting the blockage signal SS (predetermined high voltage) upon determining not to stop the driving.

<Current Determining Section 41>

The blockage determining section 40 includes the current determining section 41 that determines whether or not the inverter apparatus is in a regenerating reduction-current state where the current (absolute value) detected by the current sensor 6 while the driving control section 30 is outputting the regeneration signal SG is smaller than the preset current determination threshold.

The blockage determining section 40 is structured to determine whether or not to stop the driving of all of the plurality of switching elements 3 based on a determination result from the current determining section 41.

The current determination threshold is preset to a value larger than zero.

In the present embodiment, the current determining section 41 includes a comparator 42 that outputs a low-current signal SL when the current (absolute value) detected by the current sensor 6 is smaller than the current determination threshold, and a logic circuit 43 that outputs a regenerating reduction-current signal SGL indicating that the inverter apparatus is in the regenerating reduction-current state upon receiving both the low-current signal SL and the regeneration signal SG.

As the comparator 42, an element (for example, an operational amplifier) is used which compares two input voltages or current signals with each other to switch an output signal depending on which of the two signals is larger.

The comparator 42 receives a voltage signal SI (referred to as a current detection signal SI) proportional to the current (absolute value) detected by the current sensor 6 and a voltage signal SIth (referred to as a current threshold signal SIth) proportional to the current determination threshold. The comparator 42 is structured to output a predetermined high voltage (for example, 1 V) as the low-current signal SL when the current detection signal SI is smaller than the current threshold signal SIth and to output a predetermined low voltage (for example, 0 V) instead of outputting the low-current signal SL (predetermined high voltage) when the current detection signal SI is larger than the current threshold signal SIth.

Figure 2:
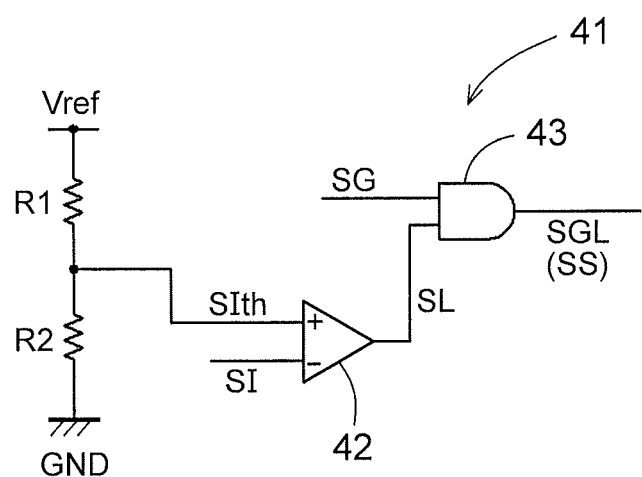
FIG. 2 is a block diagram depicting a structure of a current determining section according to the embodiment of the present disclosure.

As depicted in FIG. 2, two resistors R1, R2 are connected in series between a reference voltage Vref (for example, 5 V) and ground GND such that the voltage of a connection between the resistor R1 and the resistor R2 corresponds to the current threshold signal SIth (SIth=R2/(R1+R2)×Vref). Resistance values for the resistors R1, R2 are set by pre-adjusting the balance between the resistance value of the resistor R1 and the resistance value of the resistor R2 so as to allow generation of a voltage (current threshold signal SIth) corresponding to the current determination threshold.

Alternatively, the current threshold signal SIth may be a voltage signal output from the driving control section 30. In this case, the driving control section 30 outputs a voltage signal corresponding to the current determination threshold.

The logic circuit 43 is a logical AND circuit. The logic circuit 43 is structured to output a predetermined high voltage (for example, 1 V) as the regenerating reduction-current signal SGL when receiving the regeneration signal SG (predetermined high voltage) and the low-current signal SL (predetermined high voltage). The logic circuit 43 is structured otherwise to output a predetermined low voltage (for example, 0 V) instead of outputting the regenerating reduction-current signal SGL (predetermined high voltage).

<Current Sensor 6>

As depicted in FIG. 1, the current sensor 6 is provided on the wire 4 connecting the DC power supply DC and the inverter IN together, to detect a current flowing through the wire 4.

In the present embodiment, the current sensor 6 is provided on a positive-electrode-side portion of the wire 4 or a negative-electrode-side portion of the wire 4 (in this case, the positive-electrode-side portion) at a position closer to the DC power supply DC than the portion 8 of the wire connected to the smoothing capacitor 5.

In the present embodiment, the current sensor 6 is provided on the wire 4 between the portion 8 of the wire connected to the smoothing capacitor 5 and the relay 9.

The current sensor 6 is provided on the positive-electrode-side wire 4a between a positive-electrode-side external connection terminal P of the inverter IN and a portion 8a of the wire 4a connected to the smoothing capacitor 5. In this regard, the positive-electrode-side external connection terminal P and a negative-electrode-side external connection terminal N are the external connection terminals of the inverter IN and are connected to the DC power supply DC.

The current sensor 6 may be provided on the negative-electrode-side wire 4b at a position closer to the DC power supply DC than a portion 8b of the wire connected to the smoothing capacitor 5. Furthermore, the current sensor 6 may form the control apparatus 1 or the inverter IN, <Necessity of the Current Determining Section 41>

The electrical connection between the DC power supply DC and the inverter IN may be unexpectedly disconnected when, for example, a failure occurs in which the relay 9 shifts from the closed state to the open state due to some factor, the wire 4 connecting the DC power supply DC and the inverter IN together breaks, or some terminals included in the wire 4 are disconnected, while the AC rotary electric machine MG is being allowed to perform a regenerative operation.

When the AC rotary electric machine MG is thus allowed to perform a regenerative operation after such disconnection of the electrical connection, power resulting from regeneration is not charged in the power storage apparatus for the DC power supply DC. Consequently, the stranded power is applied to the opposite ends of the smoothing capacitor 5. Thus, as depicted in a time chart in FIG. 3, after time t11 when the electrical connection between the DC power supply DC and the inverter IN is disconnected, the system voltage Vdc across the positive-electrode-side wire 4a and the negative-electrode-side wire 4b increases rapidly from a voltage in a normal state where the electrical connection is not disconnected (after time t11). When the system voltage Vdc increases above a withstand voltage Vmx of the switching elements 3, the switching elements 3 may be broken. When the above-described disconnection occurs while the AC rotary electric machine MG is being allowed to perform a powering operation, the system voltage Vdc decreases and is thus prevented from increasing above the withstand voltage Vmx of the switching elements 3.

Thus, while the AC rotary electric machine MG is being allowed to perform a regenerative operation, the disconnection of the electrical connection between the DC power supply DC and the inverter IN needs to be detected early to stop the regenerative operation of the AC rotary electric machine MG.

A speed at which the system voltage Vdc increases at the time of the disconnection increases consistently with the power generated by the AC rotary electric machine MG. Consequently, the detection of the disconnection is more necessary particularly when high power is generated. The determination power for the driving control section 30 may be set in accordance with the value of the generated power at which the detection of the disconnection is more necessary.

In contrast, the regenerative operation of the AC rotary electric machine MG may be stopped by observing an increase in the system voltage Vdc.

However, a problem described below is posed by a comparative example structured such that whether or not to stop the driving of all of the plurality of switching elements 3 is determined by observing only an increase in the system voltage Vdc, in contrast to the present embodiment. That is, in this comparative example, a long period of time passes since the disconnection of the electrical connection between the DC power supply DC and the inverter IN until the determination to stop the diving is made.

Figure 3:
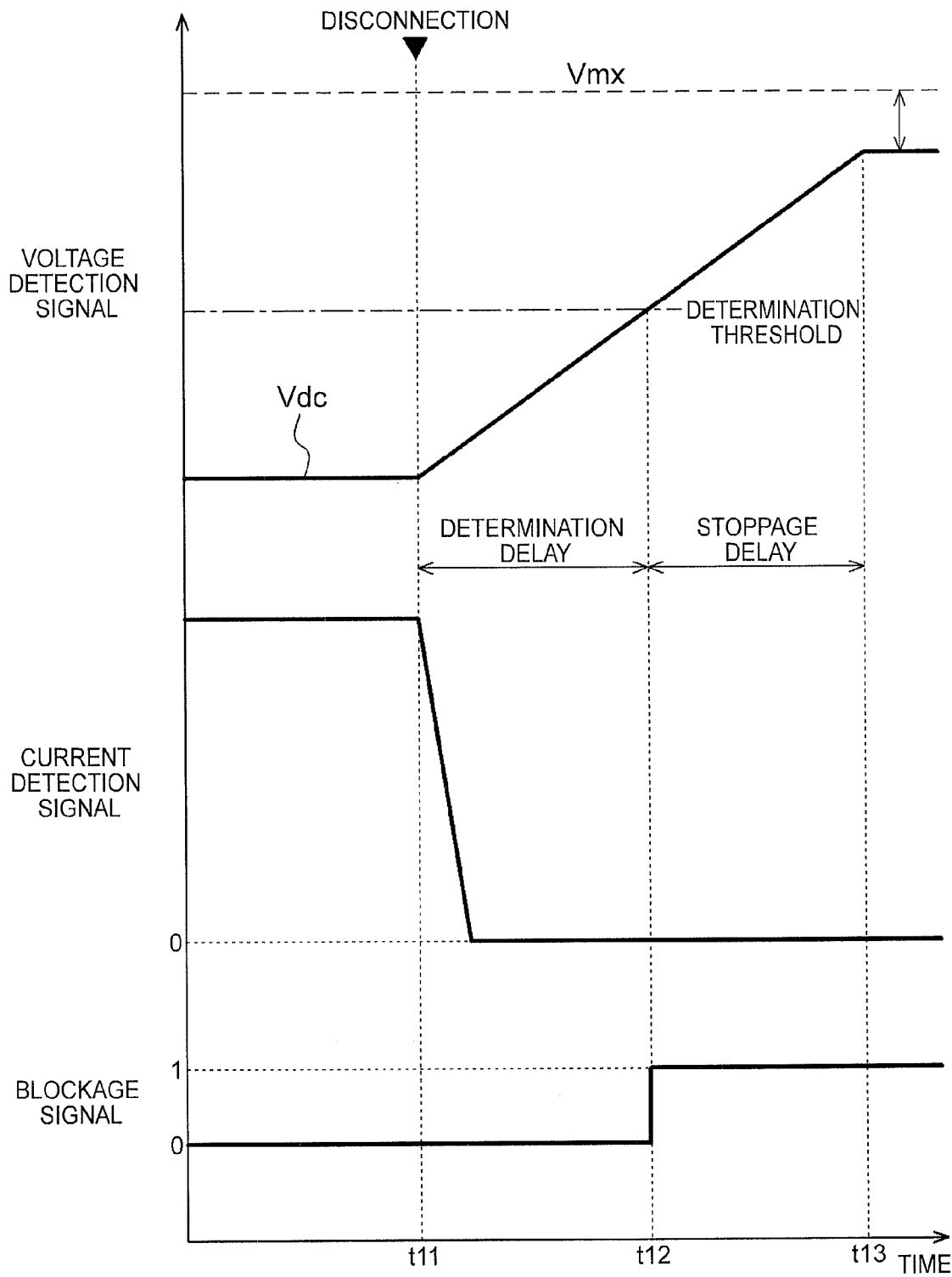
FIG. 3 is a time chart according to a comparative example of the present disclosure.

This is because the increase in system voltage Vdc following the disconnection involves a response delay due to a smoothing effect of the smoothing capacitor 5 as depicted in FIG. 3. That is, the response delay attributed to the smoothing capacitor 5 occurs after the disconnection until the system voltage Vdc reaches the determination threshold (time t11 to time t12), which leads to a long determination delay from the disconnection until the determination to stop the driving is made (time t11 to time t12). Thus, in the structure of the comparative example where only the increase in the system voltage Vdc is observed, the system voltage Vdc increases more significantly during the determination delay, and thus it is likely the system voltage Vdc reaches the withstand voltage Vmx of the switching elements 3.

<Early Detection of the Disconnection by the Current Determining Section 41>

On the other hand, the current detected by the current sensor 6 does not involve such a response delay as in the case of the system voltage Vdc.

In particular, in the present embodiment, since the current sensor 6 is provided on the positive-electrode-side portion of the wire 4 or the negative-electrode-side portion of the wire 4 at the position closer to the DC power supply DC than the portion 8 of the wire connected to the smoothing capacitor 5, the response delay associated with the current detected by the current sensor 6 is short.

Even after the electrical connection between the DC power supply DC and the inverter IN is disconnected, the smoothing effect of the smoothing capacitor 5 allows a current resulting from regeneration to flow from the switching elements 3 into the smoothing capacitor 5. Even in this case, since the current sensor 6 is provided on the wire 4 at the position closer to the DC power supply DC than the portion of the wire connected to the smoothing capacitor 5, the current flowing from the switching elements 3 into the smoothing capacitor 5 can be prevented from being detected. Therefore, when the electrical connection between the DC power supply DC and the inverter IN is disconnected and the flow of a current is prevented at the disconnected portion, the current detected by the current sensor 6 is accordingly reduced. Thus, blockage of the current can be detected without any response delay.

In the present embodiment, the blockage determining section 40 includes the current determining section 41 that determines whether the inverter apparatus is in the regenerating reduction-current state where the current (absolute value) detected by the current sensor 6 is smaller than the preset current determination threshold while the regeneration signal SG is being output from the driving control section 30 as described above. The blockage determining section 40 is structured to determine whether or not to stop the driving of all of the plurality of switching elements 3 based on the determination result from the current determining section 41.

Figure 4:
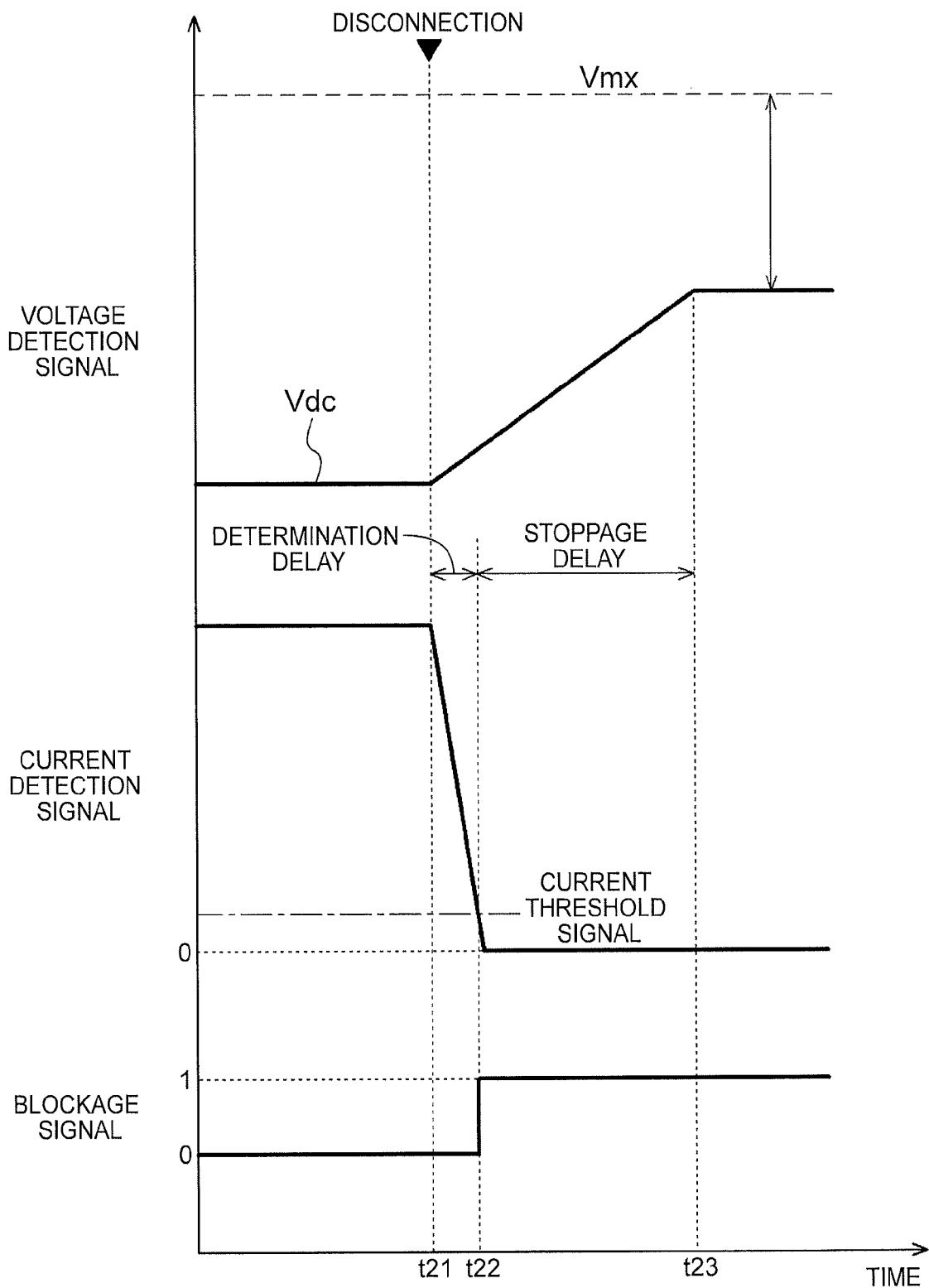
FIG. 4 is a time chart according to a first structure example of the present disclosure.

Therefore, as depicted in a time chart in FIG. 4, the present embodiment allows the determination to be made based on the current detected by the current sensor 6, which involves a shorter response delay following the disconnection than the system voltage Vdc. This enables shortening of the determination delay (from time t21 to time 22) after the disconnection of the electrical connection between the DC power supply DC and the inverter IN at time 21 until the determination is made to stop the driving, as compared to the case of the determination using only the system voltage Vdc as illustrated in FIG. 3.

<Reduction in the Capacity of the Smoothing Capacitor 5>

Furthermore, the driving section 20 according to the present embodiment has a predetermined stoppage delay time (from time t12 to time t13 in FIG. 3 and from time t22 to time t23 in FIG. 4) after the blockage signal SS is output from the blockage determining section 40 until the driving section 20 actually stops the on/off driving of the switching elements 3 for regeneration executed in accordance with the instructions from the driving control section 30 to forcibly turn off all the switching elements 3. Thus, even after the blockage determining section 40 outputs the blockage signal SS, the system voltage Vdc continues to increase until all the switching elements 3 are turned off.

A method of increasing the capacity of the smoothing capacitor 5 is available for preventing the system voltage Vdc from increasing up to the withstand voltage Vmx during the predetermined stoppage delay time.

The response delay (time constant) associated with the increase in system voltage Vdc increases in proportion to the capacity of the smoothing capacitor 5. Therefore, an increase in the capacity of the smoothing capacitor 5 enables the increase in system voltage Vdc to be reduced to prevent the system voltage Vdc from reaching the withstand voltage of the switching elements, even with the same stoppage delay time. However, the increased capacity of the smoothing capacitor 5 disadvantageously leads to an increase in the size and cost of the smoothing capacitor 5.

The above-described comparative example where only the system voltage Vdc is observed involves a long determination delay and a larger increase in the system voltage Vdc during the determination delay. Thus, in the comparative example, the smoothing capacitor 5 inevitably has a large capacity that is necessary to prevent the system voltage Vdc from reaching the withstand voltage Vmx of the switching elements 3.

However, the present embodiment in which the current is observed enables shortening of determination delay, and thus the capacity of the smoothing capacitor 5 can be reduced as compared to the comparative example. Consequently, the present embodiment enables a reduction in the size, weight, and cost of the smoothing capacitor.

Alternatively, the withstand voltage Vmx of the switching elements 3 may be reduced to maintain the capacity of the smoothing capacitor. Accordingly, it is possible to reduce the cost of the switching elements 3.

3-3-1. First Structure Example of the Blockage Determining Section 40

A first structure example of the blockage determining section 40 will be described.

The blockage determining section 40 is structured to determine to stop the driving of all of the plurality of switching elements 3 and output the blockage signal SS to the driving section 20 when the current determining section 41 determines that the inverter apparatus is in the regenerating reduction-current state.

In the present example, as depicted in FIG. 2, the blockage determining section 40 is structured to output the regenerating reduction-current signal SGL output by the current determining section 41 without any change, as the blockage signal SS.

Therefore, as described using FIG. 4, the first structure example enables a reduction in determination delay and a reduction in the increase in the system voltage Vdc during the determination delay.

3-3-2. Second Structure Example of the Blockage Determining Section 40

Now, a second structure example of the blockage determining section 40 will be described.

The blockage determining section 40 further includes a voltage determining section 50 that determines to stop the driving of all of the plurality of switching elements 3 and output the blockage signal SS to the driving section 20 when the system voltage Vdc, which is the voltage across the positive-electrode-side wire 4a and the negative-electrode-side wire 4b connecting the DC power supply DC and the inverter IN together, is higher than a preset voltage determination threshold.

The voltage determining section 50 is structured to set the voltage determination threshold smaller when the current determining section 41 determines that the inverter apparatus is in the regenerating reduction-current state than when the current determining section 41 does not determine that the inverter apparatus is in the regenerating reduction-current state.

Figure 5:
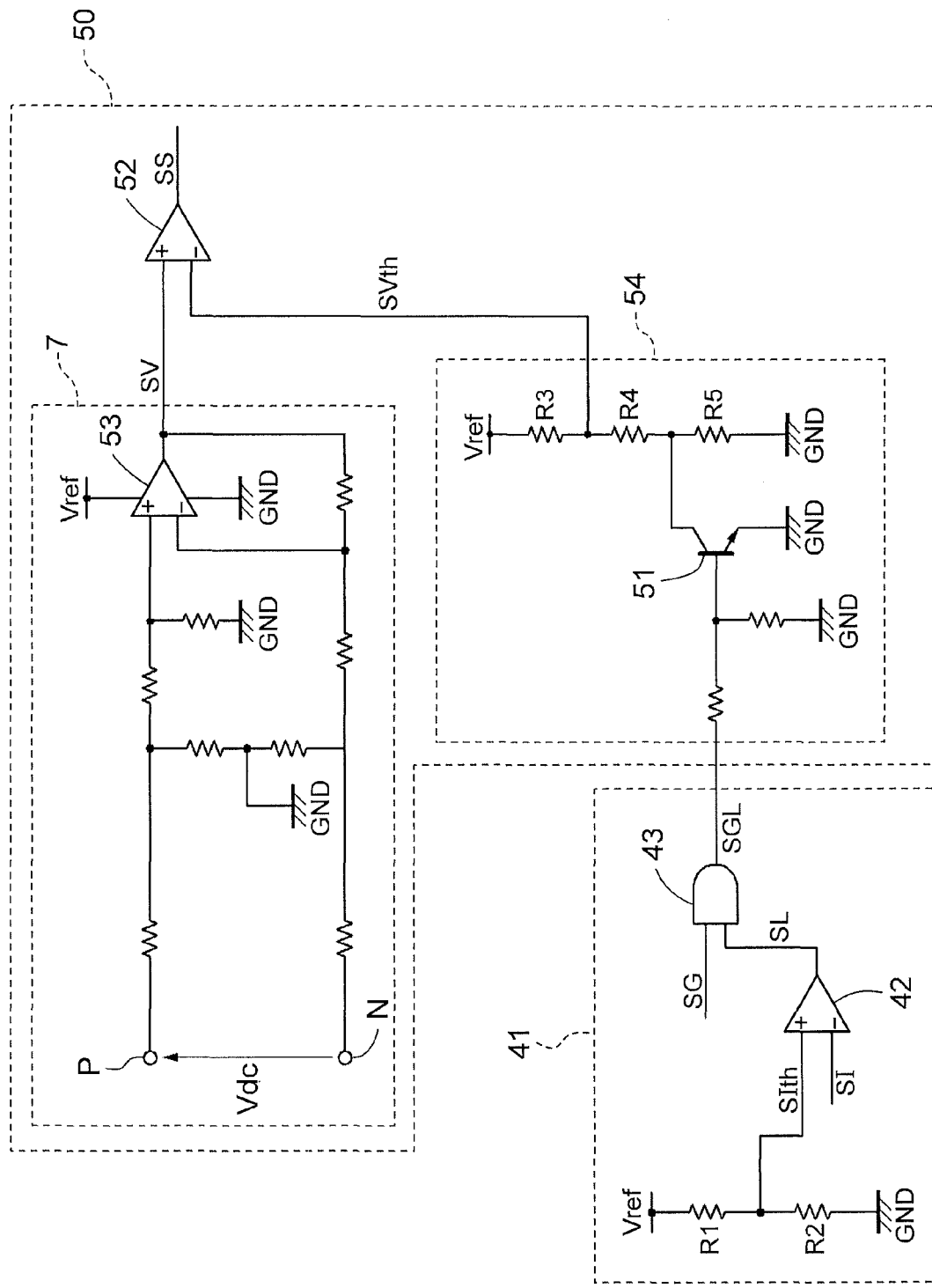
FIG. 5 is a block diagram depicting a structure of a blockage determining section according to a second structure example of the present disclosure.

In the present embodiment, as depicted in FIG. 5, the voltage determining section 50 includes a comparator 52 that outputs the blockage signal SS when the system voltage Vdc detected by the voltage detecting section 7 is higher than the voltage determination threshold, and an output switching unit 54 that sets the voltage determination threshold smaller when the regenerating reduction-current signal SGL is output from the current determining section 41 than when the regenerating reduction-current signal is not output.

That is, the voltage determination threshold for the case where the inverter apparatus is determined to be in the regenerating reduction-current state is smaller than the voltage determination threshold for the case where the inverter apparatus is not determined to be in the regenerating reduction-current state.

As the comparator 52, an element (for example, an operational amplifier) is used which compares two input voltages or current signals to switch an output signal depending on which of the two signals is larger.

The comparator 52 receives a voltage signal SV (referred to as a voltage detection signal SV) proportional to the system voltage Vdc detected by the voltage detecting section 7 and a voltage signal SVth (referred to as a voltage threshold signal SVth) proportional to the voltage determination threshold. The comparator 52 is structured to output a predetermined high voltage (for example, 1 V) as the blockage signal SS when the voltage detection signal SV is larger than the voltage threshold signal SVth and to output a predetermined low voltage (for example, 0 V) instead of outputting the blockage signal SS (predetermined high voltage) when the voltage detection signal SV is smaller than the voltage threshold signal SVth.

The output switching unit 54 includes three resistors R3, R4, R5 connected in series between the reference voltage Vref (for example, 5 V) and the ground GND. The voltage of a portion connecting the resistor R3 and the resistor R4 corresponds to the voltage threshold signal SVth. Furthermore, the output switching unit 54 includes a switching element 51. The switching element 51 connects a portion connecting the resistor R4 and the resistor R5 to the ground GND when the regenerating reduction-current signal SGL is output from the current determining section 41.

Therefore, a second voltage threshold signal SVthL that is the voltage threshold signal SVth for the case where the regenerating reduction-current signal SGL is output from the current determining section 41 is determined by the balance between the resistance value of the resistor R3 and the resistance value of the resistor R4 (SVthL=R4/(R3+R4)×Vref). A first voltage threshold signal SVthH that is the voltage threshold signal SVth for the case where the regenerating reduction-current signal SGL is not output from the current determining section 41 is determined by the balance between the resistance value of the resistor R3, the resistance value of the resistor R4, and the resistance value of the resistor R5 (SVthH=(R4+R5)/(R3+R4)×Vref).

The resistance values of the resistors R3, R4, R5 are set by pre-adjusting the balance between the resistance value of the resistor R3, the resistance value of the resistor R4, and the resistance value of the resistor R5 so as to allow generation of the first voltage threshold signal SVthH that is the voltage threshold signal SVth for the case where the inverter apparatus is not determined to be in the regenerating reduction-current state and the second voltage threshold signal SVthL that is the voltage threshold signal SVth for the case where the inverter apparatus is determined to be in the regenerating reduction-current state.

The voltage detecting section 7 is a differential amplifying circuit including an operational amplifier 53 to output the voltage detection signal SV proportional to the input system voltage Vdc. The voltage detection signal SV varies between the reference voltage Vref and the ground GND according to the system voltage Vdc.

<Time Chart>

Figure 6:
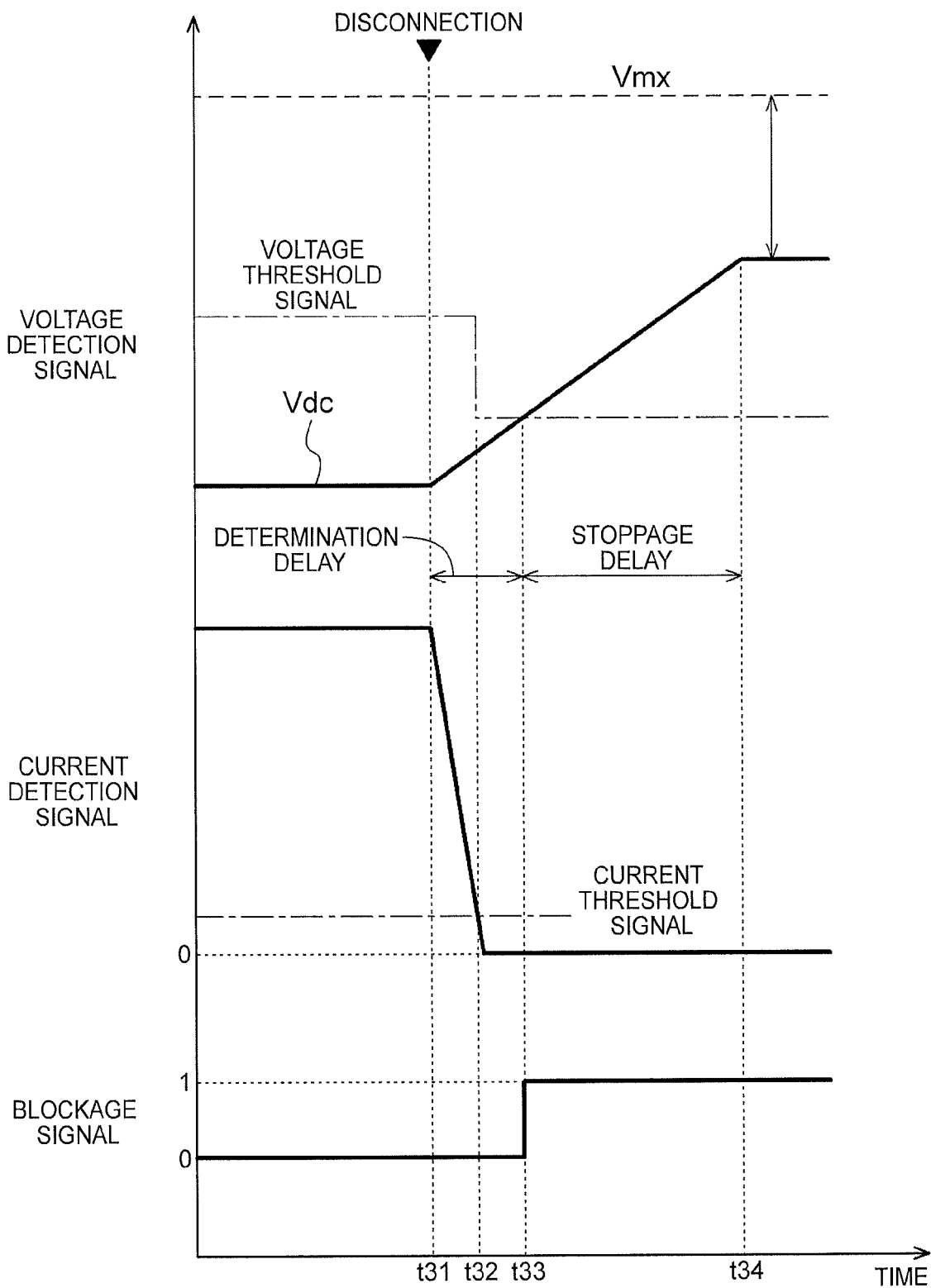
FIG. 6 is a time chart according to the second structure example of the present disclosure.

As depicted in a time chart in FIG. 6, the second structure example operates as follows after the electrical connection between the DC power supply DC and the inverter IN is disconnected at time t31. When the current determining section 41 determines that the inverter apparatus is in the regenerating reduction-current state because the current detected by the current sensor 6 is smaller than the current determination threshold (time t32), the voltage threshold signal SVth is reduced from the first voltage threshold signal SVthH for the case where the inverter apparatus is not determined to be in the regenerating reduction-current state to the second voltage threshold signal SVthL for the case where the inverter apparatus is determined to be in the regenerating reduction-current state (time t32).

The voltage threshold signal SVth is reduced based on the detection of the smaller current. Thus, the second structure example achieves a shorter determination delay after the disconnection of the electrical connection between the DC power supply DC and the inverter IN until the determination is made to stop the driving of all of the switching elements 3 (from time t31 to time t33) than the comparative example illustrated in FIG. 3. Therefore, also in the second structure example, the disconnection is detected early to enable a reduction in the capacity of the smoothing capacitor 5 and in the withstand voltage Vmx of the switching elements 3.

Other Embodiments

Finally, other embodiments of the present disclosure will be described. The structure of each of the embodiments described below is not limited to a separate application but may be combined with the structure of any other embodiment without inconsistencies.

(1) In the above-described embodiment, the case where the current determining section 41 includes the comparator 42 and the logic circuit 43 has been described by way of example. However, the embodiment of the present disclosure is not limited to this. That is, the current determining section 41 may be formed using an arithmetic processing apparatus. The determination function of the current determining section 41 may be formed using software.

(2) In the above-described embodiment, the case where the voltage determining section 50 includes the comparator 52 and the output switching unit 54 has been described by way of example. However, the embodiment of the present disclosure is not limited to this. That is, the voltage determining section 50 may be formed using an arithmetic processing apparatus. The determination function and the determination threshold switching function of the voltage determining section 50 may be formed using software.

INDUSTRIAL APPLICABILITY

The present disclosure can be preferably utilized for an inverter apparatus including an inverter interposed between an AC rotary electric machine and both a DC power supply and a smoothing capacitor and including a plurality of switching elements, and a control apparatus that controls driving of the plurality of switching elements.

The invention claimed is:

1. An inverter apparatus comprising:
   an inverter that is interposed between an AC rotary electric machine and both a DC power supply and a smoothing capacitor and that includes a plurality of switching elements;
   a controller that controls driving of the plurality of switching elements; and
   a current sensor that detects a current flowing through a wire connecting the DC power supply and the inverter together, wherein
   the controller determines whether or not to stop driving of all of the plurality of switching elements based on the current detected by the current sensor while the AC rotary electric machine is caused to perform a regenerative operation of generating power.

2. The inverter apparatus according to claim 1, wherein the controller is programmed to:
   drive the plurality of switching elements;
   output a regeneration signal while controlling the drive of the plurality of switching elements to cause the AC rotary electric machine to perform the regenerative operation of generating power equal to or higher than a preset determination power; and
   determine whether or not to stop the driving of all of the plurality of switching elements, and upon determining to stop the driving, output a blockage signal that is a signal allowing the driving of all of the plurality of switching elements to be stopped, wherein
   the processor determines whether or not the inverter apparatus is in a regenerating reduction-current state where the current detected by the current sensor is smaller than a preset current determination threshold while the regeneration signal is output, and whether or not to stop the driving of all of the plurality of switching elements is determined based on a determination result of whether or not the inverter apparatus is in the regenerating reduction-current state.

3. The inverter apparatus according to claim 2, wherein when the processor determines that the inverter apparatus is in the regenerating reduction-current state, the processor determines to stop the driving of all of the plurality of switching elements and outputs the blockage signal.

4. The inverter apparatus according to claim 3, wherein the processor outputs a low-current signal when the current detected by the current sensor is smaller than the current determination threshold, and outputs a regenerating reduction-current signal indicating that the inverter apparatus is in the regenerating reduction-current state upon receiving both the low-current signal and the regeneration signal.

5. The inverter apparatus according to claim 4, wherein the smoothing capacitor is connected between a positive-electrode-side portion of the wire and a negative-electrode-side portion of the wire that connect the DC power supply and the inverter together, and
   the current sensor is provided on the positive-electrode-side portion of the wire or the negative-electrode-side portion of the wire at a position closer to the DC power supply than a portion of the wire connected to the smoothing capacitor.

6. The inverter apparatus according to claim 3, wherein the smoothing capacitor is connected between a positive-electrode-side portion of the wire and a negative-electrode-side portion of the wire that connect the DC power supply and the inverter together, and
   the current sensor is provided on the positive-electrode-side portion of the wire or the negative-electrode-side portion of the wire at a position closer to the DC power supply than a portion of the wire connected to the smoothing capacitor.

7. The inverter apparatus according to claim 6, wherein the DC power supply includes a relay that enables electrical connection to the inverter to be disconnected, and
   the current sensor is provided on the wire between the relay and the portion of the wire connected to the smoothing capacitor.

8. The inverter apparatus according to claim 2, wherein the processor determines to stop the driving of all of the plurality of switching elements when voltage across a positive-electrode-side portion of the wire and a negative-electrode-side portion of the wire that connect the DC power supply and the inverter together is higher than a preset voltage determination threshold, and
   the processor sets the voltage determination threshold smaller when the processor determines that the inverter apparatus is in the regenerating reduction-current state than when the processor does not determine that the inverter apparatus is in the regenerating reduction-current state.

9. The inverter apparatus according to claim 8, wherein the processor outputs a low-current signal when the current detected by the current sensor is smaller than the current determination threshold, and outputs a regenerating reduction-current signal indicating that the inverter apparatus is in the regenerating reduction-current state upon receiving both the low-current signal and the regeneration signal.

10. The inverter apparatus according to claim 9, wherein the smoothing capacitor is connected between a positive-electrode-side portion of the wire and a negative-electrode-side portion of the wire that connect the DC power supply and the inverter together, and
    the current sensor is provided on the positive-electrode-side portion of the wire or the negative-electrode-side portion of the wire at a position closer to the DC power supply than a portion of the wire connected to the smoothing capacitor.

11. The inverter apparatus according to claim 10, wherein the DC power supply includes a relay that enables electrical connection to the inverter to be disconnected, and
    the current sensor is provided on the wire between the relay and the portion of the wire connected to the smoothing capacitor.

12. The inverter apparatus according to claim 8, wherein the smoothing capacitor is connected between a positive-electrode-side portion of the wire and a negative-electrode-side portion of the wire that connect the DC power supply and the inverter together, and
    the current sensor is provided on the positive-electrode-side portion of the wire or the negative-electrode-side portion of the wire at a position closer to the DC power supply than a portion of the wire connected to the smoothing capacitor.

13. The inverter apparatus according to claim 12, wherein the DC power supply includes a relay that enables electrical connection to the inverter to be disconnected, and the current sensor is provided on the wire between the relay and the portion of the wire connected to the smoothing capacitor.

14. The inverter apparatus according to claim 2, wherein the processor outputs a low-current signal when the current detected by the current sensor is smaller than the current determination threshold, and outputs a regenerating reduction-current signal indicating that the inverter apparatus is in the regenerating reduction-current state upon receiving both the low-current signal and the regeneration signal.

15. The inverter apparatus according to claim 14, wherein the smoothing capacitor is connected between a positive-electrode-side portion of the wire and a negative-electrode-side portion of the wire that connect the DC power supply and the inverter together, and
the current sensor is provided on the positive-electrode-side portion of the wire or the negative-electrode-side portion of the wire at a position closer to the DC power supply than a portion of the wire connected to the smoothing capacitor.

16. The inverter apparatus according to claim 15, wherein the DC power supply includes a relay that enables electrical connection to the inverter to be disconnected, and
the current sensor is provided on the wire between the relay and the portion of the wire connected to the smoothing capacitor.

17. The inverter apparatus according to claim 2, wherein the smoothing capacitor is connected between a positive-electrode-side portion of the wire and a negative-electrode-side portion of the wire that connect the DC power supply and the inverter together, and
the current sensor is provided on the positive-electrode-side portion of the wire or the negative-electrode-side portion of the wire at a position closer to the DC power supply than a portion of the wire connected to the smoothing capacitor.

18. The inverter apparatus according to claim 17, wherein the DC power supply includes a relay that enables electrical connection to the inverter to be disconnected, and
the current sensor is provided on the wire between the relay and the portion of the wire connected to the smoothing capacitor.

19. The inverter apparatus according to claim 1, wherein the smoothing capacitor is connected between a positive-electrode-side portion of the wire and a negative-electrode-side portion of the wire that connect the DC power supply and the inverter together, and
the current sensor is provided on the positive-electrode-side portion of the wire or the negative-electrode-side portion of the wire at a position closer to the DC power supply than a portion of the wire connected to the smoothing capacitor.

20. The inverter apparatus according to claim 19, wherein the DC power supply includes a relay that enables electrical connection to the inverter to be disconnected, and
the current sensor is provided on the wire between the relay and the portion of the wire connected to the smoothing capacitor.

* * * * *